(12) United States Patent
Sano et al.

(10) Patent No.: US 7,979,960 B2
(45) Date of Patent: Jul. 19, 2011

(54) TWO-AXIS HINGE DEVICE WITH ROTATION REGULATING FUNCTION

(75) Inventors: Masanori Sano, Tokyo (JP); Hitoshi Sato, Tokyo (JP)

(73) Assignee: Mitsubishi Steel Mfg. Co., Ltd. (JP)

( * ) Notice: Subject to any disclaimer, the term of this patent is extended or adjusted under 35 U.S.C. 154(b) by 380 days.

(21) Appl. No.: 12/159,381

(22) PCT Filed: Dec. 27, 2006

(86) PCT No.: PCT/JP2006/326087
§ 371 (c)(1),
(2), (4) Date: Jun. 26, 2008

(87) PCT Pub. No.: WO2007/077882
PCT Pub. Date: Jul. 12, 2007

(65) Prior Publication Data
US 2008/0313855 A1    Dec. 25, 2008

(30) Foreign Application Priority Data
Dec. 27, 2005   (JP) .................................. 2005-374845

(51) Int. Cl.
    *E05D 3/10*    (2006.01)
(52) U.S. Cl. ......................................................... 16/367
(58) Field of Classification Search .................... 16/367, 16/338–340, 330, 303, 380; 361/679.06; 379/433.12, 433.13; 455/575.3, 575.4, 575.1, 455/575.8, 550.1, 90.3
    See application file for complete search history.

(56) References Cited

U.S. PATENT DOCUMENTS

| 7,055,218 | B2* | 6/2006 | Lu et al. ........................... | 16/367 |
| 7,380,313 | B2* | 6/2008 | Akiyama et al. ................. | 16/367 |
| 7,533,449 | B2* | 5/2009 | Hsu ................................. | 16/367 |
| 7,603,748 | B2* | 10/2009 | Hsu et al. ........................ | 16/367 |
| 7,610,658 | B2* | 11/2009 | Lee et al. ........................ | 16/367 |
| 2004/0107540 | A1* | 6/2004 | Hsu ................................. | 16/366 |
| 2007/0174997 | A1* | 8/2007 | Lu et al. ........................... | 16/367 |

FOREIGN PATENT DOCUMENTS

JP    11257342 A   *   9/1999

(Continued)

OTHER PUBLICATIONS

International Search Report from PCT/JP2006/326087 dated Apr. 17, 2007.

*Primary Examiner* — Chuck Y. Mah
(74) *Attorney, Agent, or Firm* — Knobbe Martens Olson & Bear LLP

(57) ABSTRACT

A two-axis hinge device with rotation regulating function including the rotation regulating function capable of wiring by passing a harness through a through hole of an axis member, simple in structure, and low in cost is provided. A folding axis [5] rotatably supporting one case and a rotational axis rotatably supporting the other case are set to intersect each other, a rotation allowing portion is formed by recessing an outer circumferential side surface of a rotational operation range restricting head portion rotatably supported by a base frame [1] and arranged on an end of the folding axis [5], a rotational operation range restricting deformed head portion arranged on an end of the rotational axis so as to face the rotational operation range restricting head portion, a restricting structure portion is formed at the deformed head portion so as to restrain rotation of the folding axis [5] by abutting the outer circumferential side surface of the rotation allowing portion on an end surface and so as to restrain rotation of the rotational axis when the outer circumferential side surface abuts on the end surface of the restricting head portion, and the rotation of the rotational axis is restricted to correspond to an opening or closing angle of the folding axis [5].

9 Claims, 6 Drawing Sheets

FOREIGN PATENT DOCUMENTS

| | | | |
|---|---|---|---|
| JP | 2001227229 A * | 8/2001 | |
| JP | 2004-52373 A | 2/2004 | |
| JP | 2004-360758 | 12/2004 | |
| JP | 2005-172133 | 6/2005 | |
| JP | 2005-291399 A | 10/2005 | |
| JP | 2005-337301 A | 12/2005 | |
| JP | 2006-10025 A | 1/2006 | |
| JP | 2007-16944 A | 1/2007 | |
| WO | WO 2005/121572 A1 | 12/2005 | |

* cited by examiner

TWO-AXIS HINGE DEVICE WITH ROTATION REGULATING FUNCTION

CROSS REFERENCE TO RELATED APPLICATION

This application claims the benefit and priority to and is a U.S. National Phase of PCT International Application Number PCT/JP2006/326087, filed on Dec. 27, 2006, designating the United States of America, which claims priority under 35 U.S.C. §119 to Japanese Application Number 2005-374845 filed on Dec. 27, 2005. The disclosures of the above-described applications are hereby incorporated by reference in their entireties.

BACKGROUND OF THE INVENTION

1. Field of the Invention

The present invention relates to a two-axis hinge device with rotation regulating function used in a folded and rotational mechanism of a small-sized electronic device such as a portable telephone, a notebook-sized personal computer, an electronic notebook, a DVD monitor or a remote controller, and configured to be rotatable about intersecting two axes in predetermined ranges, respectively.

2. Description of the Related Art

Generally, a two-folded portable telephone is configured so that a two-axis hinge device including a folding axis and a rotational axis connects a first case where a keyboard is disposed to a second case into which a liquid crystal display monitor (LCD) displaying an image is incorporated, thereby performing an operation for rotating the second case with the liquid crystal display monitor around the folding axis to open or close the second case with the keyboard relative to the first case and an operation for rotating the second case with the liquid crystal display monitor around the rotational axis to turn the second case with the liquid crystal display monitor the other way while the second case with the liquid crystal display monitor is open at, for example, 90 degrees.

The conventional two-axis hinge device used as stated above includes a rotation regulating mechanism that regulates a rotational operation of the solid (through-hole-free) rotation axis according to an opening or closing angle of the solid folding axis is disposed, thereby making it possible to restrict a rotatable region of the rotational axis according to a rotational (inclination) angle of the folding axis. Further, the rotation regulating mechanism enables an operation for viewing a monitor at a certain optimum position (e.g., a position at which the monitor is open at 90 degree) while rotating the monitor by arranging a liquid crystal display screen for the monitor on a blanket of the rotational axis in, for example, a portable terminal device and arranging a key operating panel on a blanket of the folding axis. Furthermore, there is proposed a rotation regulating mechanism provided in the portable terminal device and preventing a failure from occurring if the key operating panel collides against the monitor by rotation of the monitor (see, for example, Patent Document 1).

There is also conventionally proposed a two-axis hinge device configured so that an air core pipe axis is used as the rotational axis and a harness (a fine electric wire) passes through a hollow of the rotational axis, thereby facilitating wiring, improving functions, and making the device small in size and light in weight (see, for example, Patent Document 2).

If the rotational axis is formed into a hollow pipe shape so as to facilitate wiring by passing the harness through the hollow of the rotational axis, such a conventional two-axis hinge device is made large in size so that the rotation regulating mechanism may sufficiently regulate operation. Accordingly, it is difficult to reduce the size of the two-axis hinge device by forming the rotation regulating mechanism integrally with the hollow rotational axis. Moreover, the two-axis hinge device has the following problem that a harness that passes through the hollow of the rotational axis including the rotation regulating mechanism is sandwiched between constituent members of the rotation regulating mechanism and is broken.

Patent Document 1: Japanese Patent Application Laid-Open (JP-A) No. 2004-360758
Patent Document 2: JP-A No. 2005-172133

SUMMARY OF THE INVENTION

Problem to be Solved by the Invention

In view of the above-described problems, the object of the present invention is to provide a two-axis hinge device with rotation regulating function that enables wiring by passing a harness through a through hole of an axis member thereof, has a function of restricting operation in an appropriate range, and is simple in structure and low in cost.

Means for Solving Problem

A two-axis hinge device with rotation regulating function according to a first aspect of the invention is characterized by including: a folding axis for rotatably supporting one case; a rotational axis for rotatably supporting the other case; a base frame setting the folding axis and the rotational axis to intersect each other, and rotatably supporting the folding axis and the rotational axis; a rotational operation range restricting head portion arranged on an end of the folding axis; a rotation allowing portion formed by recessing an outer circumferential side surface of the rotational operation range restricting head portion into a predetermined shape; a rotational operation range restricting deformed head portion arranged on an end of the rotational axis so as to face the rotational operation range restricting head portion; and a restricting structure portion formed at the rotational operation range restricting deformed head portion so as to restrain rotation of the folding axis by abutting the outer circumferential side surface of the rotation allowing portion of the rotational operation range restricting head portion on an end surface, and so as to restrain rotation of the rotational axis when the outer circumferential side surface abuts on the end surface of the rotational operation range restricting head portion.

By configuring the two-axis hinge device with rotation regulating function as described above, the rotation allowing portion of the rotational operation range restricting head portion provided at the folding axis restricts rotational operation of the folding axis while being abuttable on the end surface of the restricting structure portion of the rotational operation range restricting deformed head portion provided at the rotational axis. Furthermore, the rotation allowing portion allows the rotational operation of the folding axis while the restricting structure portion of the rotational operation range restricting deformed head portion provided at the rotational axis is detached from the rotational operation range restricting head portion provided at the folding axis.

Moreover, the rotation allowing portion of the rotational operation range restricting head portion provided at the folding axis allows the rotational operation of the rotational axis while being abuttable on the end surface of the restricting structure portion of the rotational operation range restricting deformed head portion provided at the rotational axis. Furthermore, the rotation allowing portion restricts the rotational operation of the rotational axis while the restricting structure portion of the rotational operation range restricting deformed head portion provided at the rotational axis is detached from the rotational operation range restricting head portion provided at the folding axis and while the end surface of the rotational operation range restricting head portion provided at the folding axis is abuttable on the outer circumferential side surface of the rotational operation range restricting deformed head portion provided at the rotational axis.

Therefore, in the two-axis hinge device with rotation regulating function, a shape of the rotation allowing portion of the rotational operation range restricting head portion provided at the folding axis and that of the restricting structure portion of the rotational operation range restricting deformed head portion provided at the rotational axis are appropriately designed. By doing so, the rotational operation of the rotational axis may be restricted to correspond to an opening or closing angle of the folding axis, one case and the other case attached to the two-axis hinge device with rotation regulating function may be rotated around the two intersecting axes in predetermined ranges, respectively, and collision of one case against the other case may be prevented and one case and the other case may be prevented from being damaged during the operation.

A two-axis hinge device with rotation regulating function according to a second aspect of the present invention is characterized by including: a base frame formed into an angular member having both ends bent in same direction; axis holes for a folding axis protruding to bent portions on the both ends of the base frame, respectively; a folding axis attached to one of the axis holes for the folding axis of the base frame so as to rotatably support one case; an auxiliary folding axis including a through hole which a harness is passed through, and attached to another one of the axis holes for the folding axis of the base frame so as to rotatably support the one case integrally with the folding axis; an axis hole for a rotational axis formed at a position between the bent portions on the both ends of the base frame; a rotational axis having a through hole through which the harness is passed, and being attached to the axis hole for the rotational axis of the base frame so as to rotatably support the other case around the rotational axis intersecting the folding axis; a rotational operation range restricting head portion arranged on an end of the folding axis; a rotation allowing portion formed by recessing an outer circumferential side surface of the rotational operation range restricting head portion into a predetermined shape; a rotational operation range restricting deformed head portion arranged on an end of the rotational axis to face the rotational operation range restricting head portion; and a restricting structure portion formed at the rotational operation range restricting deformed head portion so as to restrain rotation of the folding axis by abutting the outer circumferential side surface of the rotation allowing portion of the rotational operation range restricting head portion on an end surface, and so as to restrain rotation of the rotational axis when the outer circumferential side surface abuts on the end surface of the rotational operation restricting head portion.

By configuring the two-axis hinge device with rotation regulating function as stated above, the rotation allowing portion of the rotational operation range restricting head portion provided at the folding axis restricts rotational operation of the folding axis while being abuttable on the end surface of the restricting structure portion of the rotational operation range restricting deformed head portion provided at the rotational axis. Furthermore, the rotation allowing portion allows the rotational operation of the folding axis while the restricting structure portion of the rotational operation range restricting deformed head portion provided at the rotational axis is detached from the rotational operation range restricting head portion provided at the folding axis.

Moreover, the rotation allowing portion of the rotational operation range restricting head portion provided at the folding axis allows the rotational operation of the rotational axis while being abuttable on the end surface of the restricting structure portion of the rotational operation range restricting deformed head portion provided at the rotational axis. Furthermore, the rotation allowing portion restricts the rotational operation of the rotational axis while the restricting structure portion of the rotational operation range restricting deformed head portion provided at the rotational axis is detached from the rotational operation range restricting head portion provided at the folding axis and while the end surface of the rotational operation range restricting head portion provided at the folding axis is abuttable on the outer circumferential side surface of the rotational operation range restricting deformed head portion provided at the rotational axis.

Therefore, in the two-axis hinge device with rotation regulating function, a shape of the rotation allowing portion of the rotational operation range restricting head portion provided at the folding axis and that of the restricting structure portion of the rotational operation range restricting deformed head portion provided at the rotational axis are appropriately designed. By doing so, the rotational operation of the rotational axis may be restricted to correspond to an opening or closing angle of the folding axis, one case and the other case attached to the two-axis hinge device with rotation regulating function may be rotated around the two intersecting axes in predetermined ranges, respectively, and collision of one case against the other case may be prevented and one case and the other case may be prevented from being damaged during the operation.

Furthermore, in the two-axis hinge device with rotation regulating function configured as described above, the harness is caused to pass through the through hole of the rotational axis and then caused to pass through the through hole of the auxiliary folding axis member, whereby wiring may be arranged to pull the harness around so as to insert the harness into the interior of the two-axis hinge device with rotation regulating function between one case and the other case. Additionally, in the two-axis hinge device with rotation regulating function, the auxiliary folding axis member is arranged to be apart from the surrounding of the through hole of the rotational axis in a direction opposite to the rotational operation restricting head portion of the folding axis. Therefore, the harness that is pulled out from the auxiliary folding axis, is bent, and enters into the through hole of the rotational axis may be separated from the portion of the two axis hinge device in which the rotational operation range restricting head portion and the deformed head portion contact with each other to restrict operation. Therefore, the harness may be prevented from being sandwiched between the rotational operation range restricting head portion 33 and the deformed head portion 34 and from being disconnected.

The invention according to a third aspect is the two-axis hinge device with rotation regulating function of the first or second aspect, characterized in that a rotation stopper is attached to the base frame so as to abut on the restricting structure portion of the rotational operation range restricting deformed head portion to restrict a rotation range of the rotational axis.

By configuring the two-axis hinge device with rotation regulating function as stated above, the invention according to the third aspect, may attain functions and effects of the invention according to the first or second aspect. Further, the rotation stopper abuts on the restricting structure portion of the rotational operation range restricting deformed head portion of the rotational axis to restrict the rotational range of the rotational axis. Besides, the rotational operation range restricting head portion of the folding axis abuts on a part of the restricting structure portion of the rotational operation range restricting deformed head portion of the rotational axis to restrain the rotational axis from rotating in one direction, and the rotation stopper abuts on a part of the restricting structure portion of the rotational operation range restricting deformed head portion to restrain the rotational axis from rotating in another direction, whereby the rotational axis may be set in a stationary state in which the rotational axis is not rotatable in either clockwise or anti-clockwise direction.

The invention according to a fourth aspect is the two-axis hinge device with rotation regulating function of any one of the first to third aspects, characterized in that strength is increased by structuring the rotational operation range restricting head portion of the folding axis into a solid structure.

By configuring the two-axis hinge device with rotation regulating function as described above, the invention according to the fourth aspect, may attain functions and effects of the invention according to any one of the first to third aspects, as well as the rotation stopper abuts on the restricting structure portion of the rotational operation range restricting deformed head portion of the rotational axis to restrict the rotational range of the rotational axis. Further, the rotational operation range restricting head portion of the folding axis abuts on a part of the restricting structure portion of the rotational operation range restricting deformed head portion of the rotational axis to restrain the rotational axis from rotating in one direction, and the rotation stopper abuts on a part of the restricting structure portion of the rotational operation range restricting deformed head portion to restrain the rotational axis from rotating in another direction, whereby the rotational axis may be set in a stationary state in which the rotational axis is not rotatable in either left or right direction.

The invention according to a fifth aspect is the two-axis hinge device with rotation regulating function according to the second aspect, characterized in that a folding axis holder having a block-shaped reinforcing structure formed integrally in the portion supporting the folding axis is fastened to the base frame so as to be along an interior of the angular portion of the base frame in the portion in which the one axis hole for the folding axis supporting the folding axis is provided.

By configuring the two-axis hinge device with rotation regulating function as stated above, if a heavy rotational load is applied to the operation regulating folding axis while the rotation allowing portion of the rotational operation range restricting head portion provided at the rotation regulating folding axis restricts the rotational operation range restricting head portion from rotating by in a state in which the rotation allowing portion is abuttable on the end surface of the restricting structure portion of the rotational operation range restricting deformed head portion provided at the rotational axis, a strong reactive force acting to force out the axis holes for the folding axis of the base frame and the folding axis holder is received by and shared between the angular portion in which the axis holes for the folding axis supporting the folding axis and in the portion of the base frame in which the axis hole for the folding axis for supporting the folding axis is provided and the folding axis holder. Therefore, the bent portion bent from and continuous to the flat portion of the base frame to the portion in which the axis hole for the folding axis is formed may be prevented from being deformed so as to open.

Advantages of the Invention

The invention provides a two-axis hinge device with rotation regulating function capable of arranging wiring by passing a harness through a through hole of a axis member constituting a hinge, capable of restricting operation in an appropriate range by the rotation regulating function, simple in structure, and low in cost.

DETAILED DESCRIPTION OF THE PREFERRED EMBODIMENT

An exemplary embodiment of a two-axis hinge device with rotation regulating function according to the present invention will be described hereinafter with reference to FIGS. 1 to 6.

Figure 1:
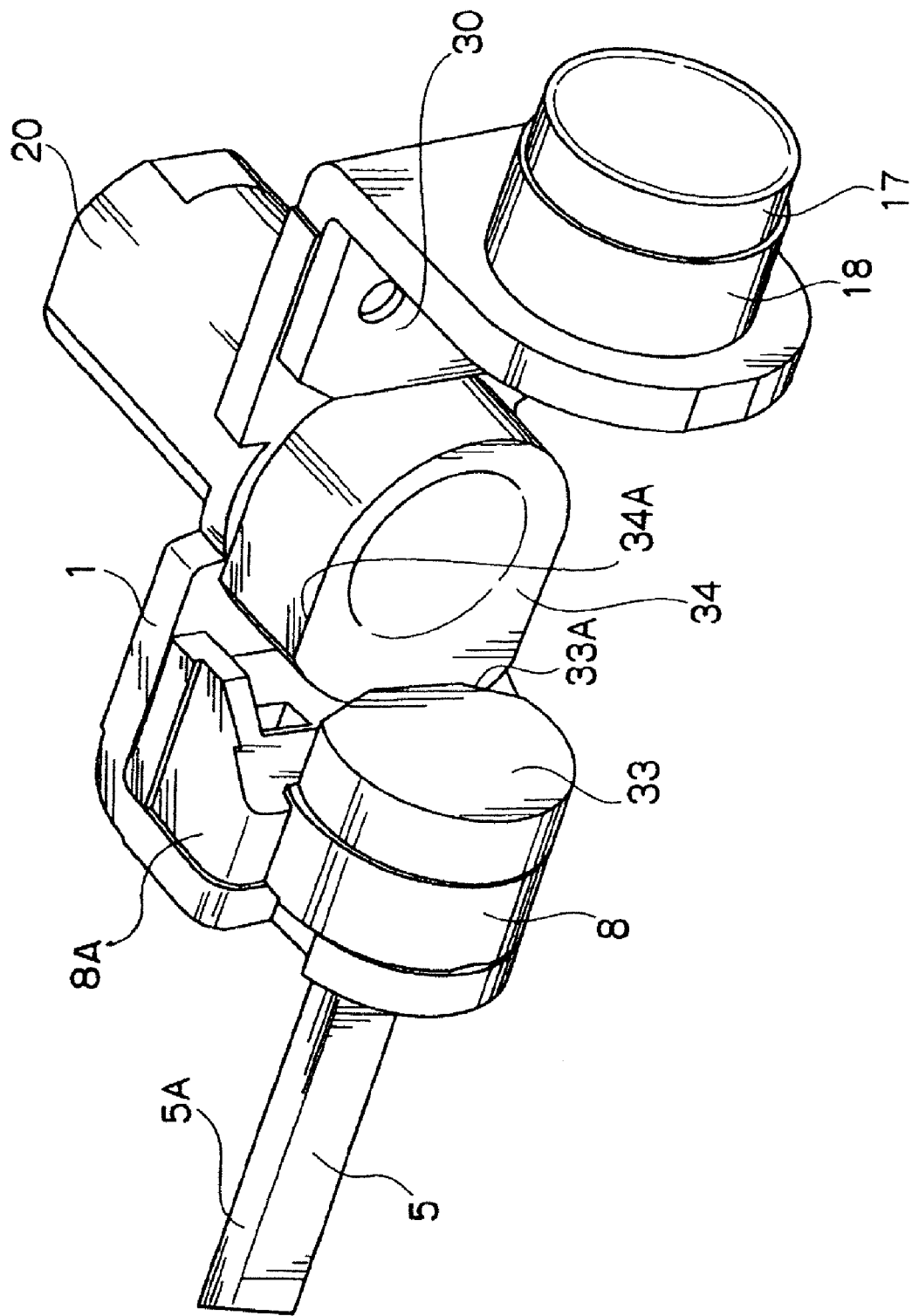
FIG. 1 is a perspective view showing principal parts of a two-axis hinge device with rotation regulating function according to an exemplary embodiment of the present invention in a state in which a rotational axis member is made rotatable.
Figure 2:
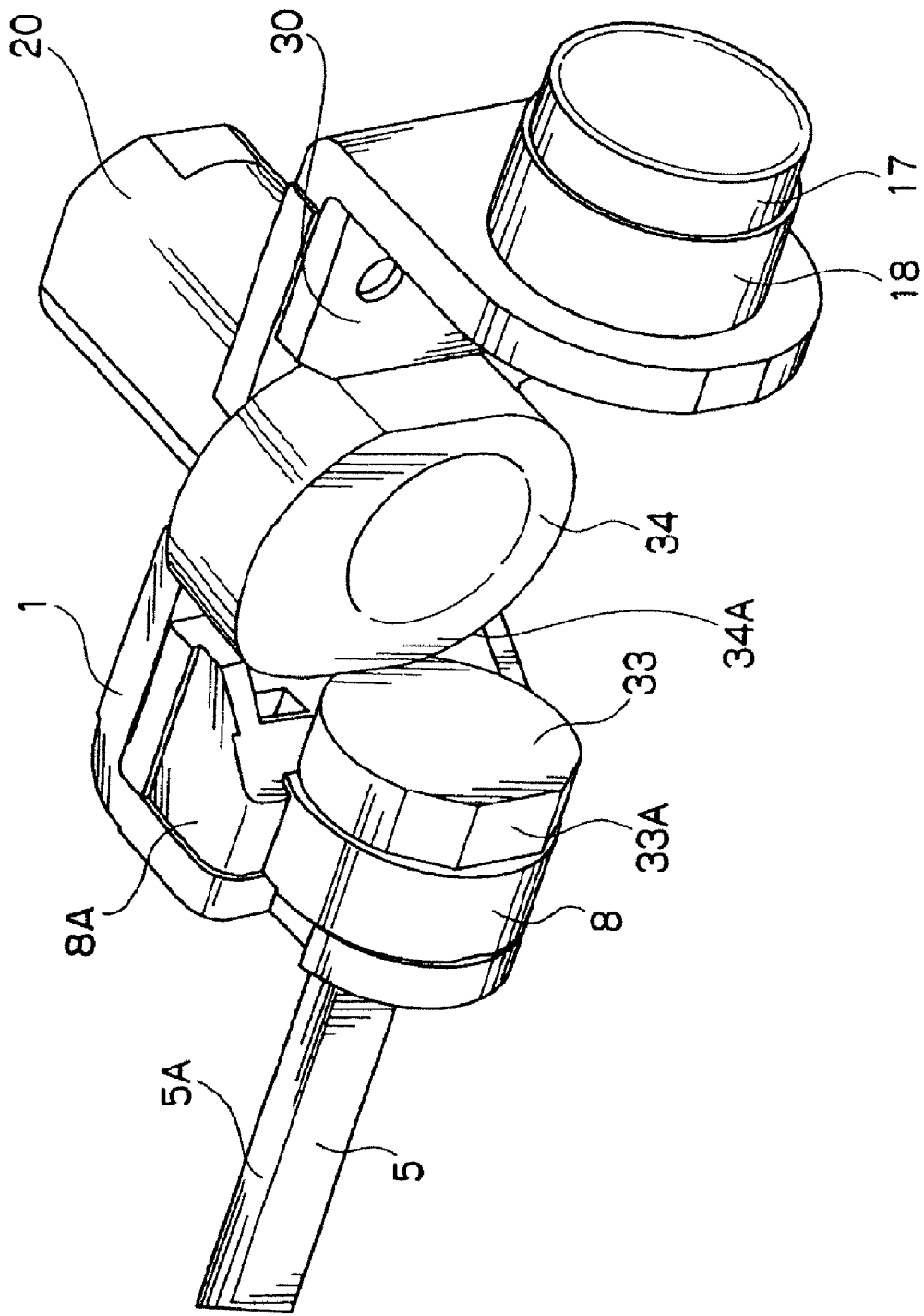
FIG. 2 is a perspective view showing principal parts of the two-axis hinge device with rotation regulating function according to the exemplary embodiment of the invention in a state in which an operation regulating folding shaft member is made rotatable.
Figure 6:
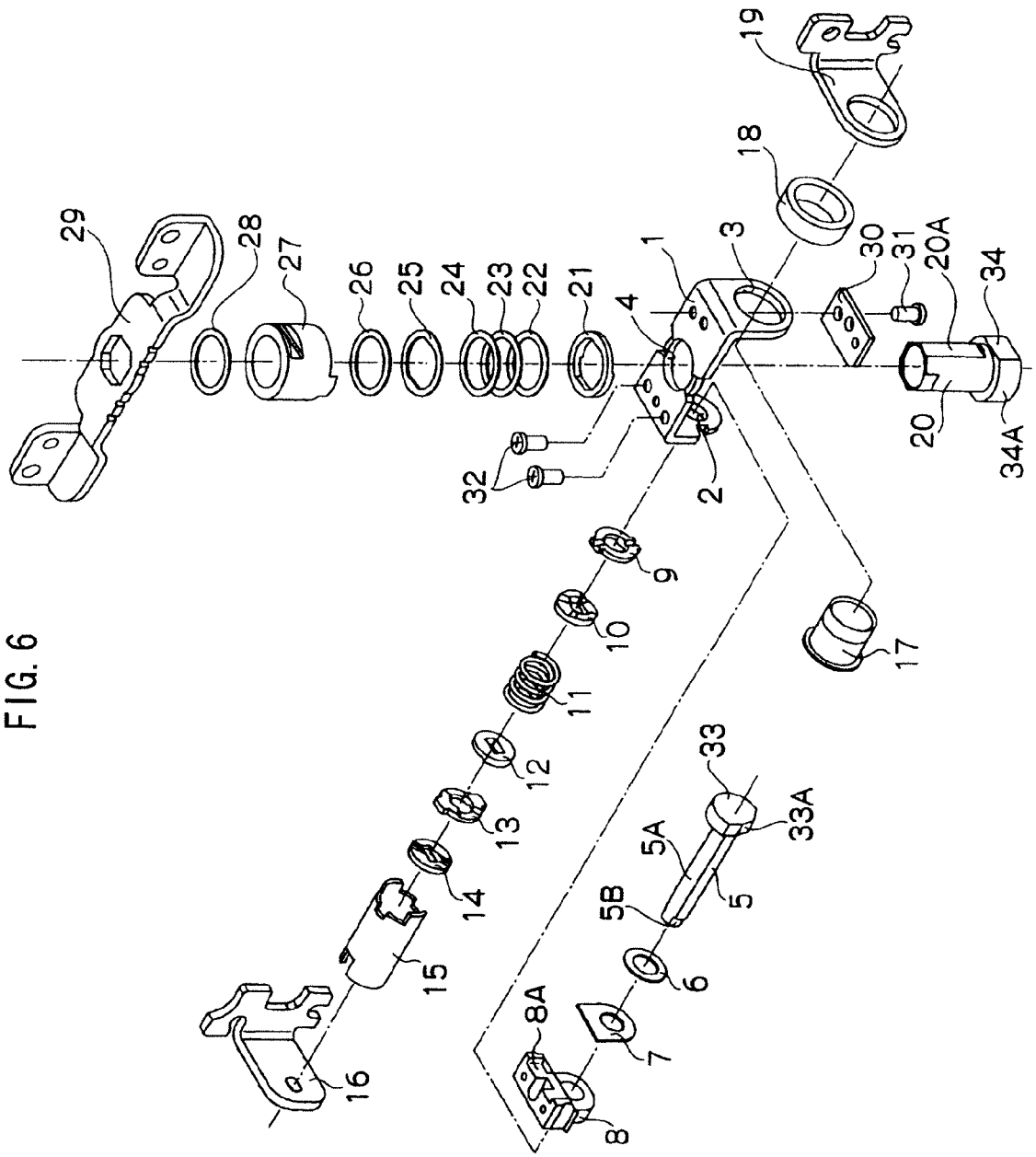
FIG. 6 is an exploded perspective view showing the two-axis hinge device with rotation regulating function according to the exemplary embodiment of the invention.

FIGS. 1 and 2 are whole perspective views of the two-axis hinge device with rotation regulating function. FIG. 6 is an exploded perspective view of the two-axis hinge device with rotation regulating function. In the drawings, reference numeral 1 denotes a base frame. A folding axis and a rotational axis are attached to the base frame 1 so that rotation central axes are arranged in intersecting directions with respect to each other, thereby constituting the two-axis hinge device with rotation regulating function, as shown in FIGS. 1 to 5.

As shown in FIG. 6, the base frame 1 is an angular member having an inverted U shape in general and formed by bending both ends of a generally rectangular metal member in the same direction. Axis holes 2 and 3 for a folding axis linearly penetrating through the two bent free ends are formed in the two bent free ends, respectively. An axis hole 4 for a rotational axis is formed in a central portion of the base frame 1 between the two bent free ends.

An operation regulating folding axis member 5, a plastic washer 6, a folding axis backing plate 7, a folding axis holder 8, a rotational cam member 9, a fixed cam member 10, a helical compression spring 11, a fixed cam member 12, a rotational cam member 13, a clip plate member 14, a folding unit case 15, and a stand member 16 constituting one of rotational systems of the folding axis are attached to the axis hole 2 for the folding axis formed in one of the two bent free ends of the base frame 1.

Furthermore, an auxiliary folding axis member 17, a folding axis ring 18, and a stand member 19 constituting the other rotational system of the folding axis are attached to the axis hole 3 for the folding axis formed in the other bent free end of the base frame 1.

The auxiliary folding axis member 17 is formed into a cylindrical shaped (pipe shaped) member having a through hole through which a harness (fine electric wire, not shown) is passed through. While, a rotational axis member 20 is a cylindrical shaped (pipe shaped) member having a through hole for passing through a harness (fine electric wire, not shown).

Furthermore, the rotational axis member 20, a fixed cam member 21, three disc springs 22, 23, and 24, a rotational spacer 25, a plastic washer 26, a rotational ring 27, a plastic washer 28, and a blanket 29, all of which constitute a rotational system of a rotational axis are attached into the axis hole 4 for the rotational axis formed in the central portion between the two bent free ends of the base frame 1.

Moreover, a cam surface is formed around a surface of the axis hole 4 for the rotational axis of the base frame 1 at a symmetric position with respect to the fixed cam member 21 at an angle of 180 degrees to correspond to the fixed cam member 21. The base frame 1 is configured to perform a click operation for restraining the fixed cam member 21 to be temporarily fastened by fitting irregularities of both cam surfaces into each other when the fixed cam member 21 rotates by an angle of 180 degrees.

A rotation stopper 30 for restricting a rotation range of the rotational axis member 20 is fastened to and arranged on a flat portion between the two bent free ends of the base frame 1 by a screw 31.

A rotational operation range restricting head portion 33 is provided integrally on one end of an axial rod of the operation regulating folding axis member 5 employed in the two-axis hinge device with rotation regulating function. A rotation allowing portion 33A that is a recess notched into a predetermined shape on an outer circumferential portion of a disc formed concentrically with the axial rod of the operation regulating folding axis member 5 is provided at the rotational operation range restricting head portion 33.

The rotational operation range restricting head portion 33 is configured so as to be able to secure a sufficiently high strength to restrict operation of the rotational axis member 20 by making the rotational operation range restricting head portion 33 a solid structure (a structure without a through hole) and thereby improving the strength of the head 33 despite of the small size thereof.

Furthermore, as shown in FIG. 6, a portion near the rotational operation range restricting head portion 33 toward the free end of the operation regulating folding axis member 5 is formed into a spline portion 5A having an oval-shaped section (a sectional shape other than a circular shape having a major diameter and a minor diameter) in which opposing circular arc portions having circular cross sections are cut from left in the drawing. Further, a fitting portion 5B having a rectangular cross section is formed on the free end thereof.

The plastic washer 6, the folding axis backing plate 7, and the folding axis holder 8 are fitted into a circular axis near the rotational operation restricting head portion 33 of the operational regulating folding axis member 5 thus formed. The folding axis member 5 into which the plastic washer 6, the folding axis backing plate 7, and the folding axis holder 8 are fitted is inserted into the axis hole 2 for the folding axis of the base frame 1. By fastening the folding axis holder 8 to the base frame 1 using screws 32, the rotational operation restricting head portion 33 is rotatably assembled into the axis hole 2 for the folding axis of the base frame 1.

The folding axis holder 8 is also structured to serve as a reinforcing member that reinforces an angular portion (a portion bent at right angle) from the flat portion of the base frame 1 to the free end which is bent with respect to the flat portion and continuous to the flat portion and in which the axis hole 2 for the folding axis is formed.

As shown in FIGS. 1 to 3 and 6, in the folding axis holder 8, a rectangular block-shaped reinforcing structure 8A is formed integrally on a ring portion thereof into which the operation regulating folding axis member 5 is inserted so that the folding axis holder 8 is structured to serve as the reinforcing member.

A tangential surface portion bent at right angle is formed on the reinforcing structure 8A so as to be located along an inner side surface of the portion bent at right angle on the axis hole 2-side for the folding axis of the base frame 1 without gaps.

Furthermore, the folding axis holder 8 is formed so that a ring-shaped end surface into which the operation regulating folding axis member 5 is inserted is continuous in plane to the free end of the tangential surface bent at right angle of the reinforcing structure 8A.

The folding axis holder 8 configured as stated above constitutes the reinforcing structure in which an outer side surface bent at right angle from the tangential surface bent at right angle to the end surface of the ring-shaped portion of the folding axis holder 8 is located along the inner side surface of the portion bent at right angle on the axis hole 2-side for the folding axis of the base frame 1 without gaps in a state in which the folding axis holder 8 is fastened to the base frame 1 by the screws 32.

In the base frame 1 reinforced by the reinforcing structure 8A of the folding axis holder 8 as stated above, when a heavy rotational load is applied to the operation regulating folding axis member 5 in a state, for example, shown in FIG. 1, in which the rotation allowing portion 33A of the rotational operation range restricting head portion 33 located on a tip end of the rotation regulating folding axis member 5 restricts the rotational operation range restricting head portion 33 from rotating by abutting on an end surface of a restricting structure portion 34A of a deformed head portion 34. At the time, a strong reactive force acts in a direction of forcing out the axis hole 2 for the folding axis of the base frame 1 and the folding axis holder 8 toward outside of the free end.

The strong reactive force is received by and shared between the angular portion, which extends from the flat portion of the base frame 1 to the free end which is bent with respect to the flat portion and continuous to the flat portion and in which the axis hole 2 for the folding axis is formed, and the folding axis holder 8 fastened to the flat portion of the base frame 1 by the screws 32.

Therefore, in the base frame 1 reinforced by the reinforcing structure 8A of the folding axis holder 8, even if the strong reactive force acts in the direction of forcing out the axis hole 2 for the folding axis of the base frame 1 and the folding axis holder 8 toward outside of the free end, it can be prevented that the portion that is bent at the right angle and extends between the flat portion to the free end of the base frame 1 including the axis hole 2 for the folding axis formed therein is deformed so that the internal angle of the portion increases.

Without providing the reinforcing structure by the folding axis holder 8 and only with the base frame 1 supporting the operation regulating folding axis member 5, if a high rotational load is applied to the operation regulating folding axis member 5 in the state shown in FIG. 1 and the rotation allowing portion 33A of the rotational operation range restricting head portion 33 restricts the rotational operation range restricting head portion 33 from rotating by abutting on the end surface of the restricting structure portion 34A of the deformed head portion 34 so that a strong reactive force acts therebetween, the portion bent at right angle and extending from the flat portion of the base frame 1 to the free end thereof which is formed continuous to the flat portion, bent with respect thereto and includes the axis hole 2 for the folding axis that is formed therein often deforms so that the internal angle thereof increases. On the other hand, in the base frame 1 reinforced by the reinforcing structure 8A of the folding axis holder 8, such deformation can be prevented.

As shown in FIG. 6, the rotational cam member 9, the fixed cam member 10, the helical compression spring 11, the fixed cam member 12, the rotational cam member 13, the clip plate member 14, and the folding unit case 15 are attached to the spline portion 5A of the operation regulating folding axis member 5.

Furthermore, the rotational cam members 9 and 13 are attached integrally to the folding unit case 15. The fixed cam members 10 and 12 and the clip plate member 14 are attached to rotate integrally with the operation regulating folding axis member 5. The folding unit case 15 is attached integrally to the base frame 1.

Moreover, a stand member 16 is attached to the fitting portion 5B of the operation regulating folding axis member 5. A first case (a case where a keyboard is arranged), not shown, is fastened to the stand member 16.

Thus, the rotational cam member 9, the fixed cam member 10, the helical compression spring 11, the fixed cam member 12, and the rotational cam member 13 constitute a torque-generating cam mechanism. The torque-generating cam mechanism performs a predetermined operation for automatically rotating members attached to the stand member 16 rotating integrally with the operation regulating folding axis member 5 by a rotary torque generated by a sliding operation that occurs to an inclined surface of a cam surface in response to an urging force of the helical compression spring 11 when the stand member 16 is rotated to a predetermined position.

Further, between the surrounding of the axis hole 2 for the folding axis and the rotational cam member 9 and between the rotational cam member 13 and the clip plate member 14, recesses and protrusions that can engage or separate with each other are formed, and by the recesses and the protrusions, a stopper mechanism performing a click operation is constituted so that the members attached to the stand member 16 that rotates integrally with irregular the operation regulating folding axis member 5 is temporarily fastened by the engagement of the recesses with the protrusions.

Namely, the two-axis hinge device with rotation regulating function constitutes a semi-automatic opening mechanism, in which the stopper mechanism restrains the operation regulating folding axis member 5 so as to set the two-axis hinge device with rotation regulating function in a predetermined open state when the operation regulating folding axis member 5 reaches a position at a predetermined angle by the above-stated torque-generating cam mechanism rotating the operation regulating folding axis member 5 when members attached to the operation regulating folding axis member 5 are manually rotated up to a predetermined position.

In the two-axis hinge device with rotation regulating function, the auxiliary folding axis member 17 is attached to be rotatably supported by the axis hole 3 portion for the folding axis of the base frame 1 via the folding axis ring 18, and an opening of the stand member 19 is fitted into and fixedly caulked to a free end of the auxiliary folding axis member 17.

The first case (a case where a keyboard is arranged), not shown, is fastened to the stand member 19.

The rotational operation range restricting deformed head portion 34 is integrally provided on one end of the rotational axis member 20 employed in the two-axis hinge device with rotation regulating function. A circular arc portion concentric with a rotational axis of the rotational axis member 20 and the restricting structure portion 34A of a predetermined shape a part of which is extended from a concentric circle of the rotational axis are provided on the deformed head portion 34.

The rotational axis member 20 configured as stated above is inserted into the axis hole 4 for a rotational axis of the base frame 1 from an end opposite to the deformed head portion 34. Consequently, operation of the rotational axis member 20 is restricted by a rotation stopper 30 arranged adjacent to the deformed head portion 34 so that the rotational axis member 20 is rotatable in a range in which the restricting structure portion 34A does not abut on the rotation stopper 30.

A spline portion 20A having an oval section shape that is a circular cross section in which opposing circular arc portions are removed (a sectional shape other than a circular shape having a major diameter and a minor diameter) is formed on the rotational axis member 20. The fixed cam member 21 is inserted into the spline portion 20A so that the fixed cam member 21 may not rotate but may move in a rotational axis direction, and the disc springs 22, 23, and 24, the rotational spacer 25, the plastic washer 26, the rotational ring 27, and the plastic washer 28 are also inserted into the spline portion 20A.

Moreover, in the rotational axis member 20, a part of an outer circumferential surface of the end opposite to the deformed head portion 34 is notched, and a fitting hole of the blanket 29 is fitted into and fixedly caulked to the notched part.

A second case (a case where an LCD monitor is arranged), not shown, is fastened to the blanket 29.

In the two-axis hinge device with rotation regulating function configured as shown in FIGS. 1 to 5, a range of movement is restricted in an appropriate range by the rotational operation range restricting head portion 33 of the operation regulating folding axis member 5 and a part of the deformed head portion 34 of the rotational axis member 20, both of which are arranged so as to be adjacent and perpendicular to each other. In addition, in the two-axis hinge device with rotation regulating function, the rotation stopper 30 restricts the rotation range of the rotational axis 20 in an appropriate range.

Furthermore, a shape of the rotation allowing portion 33A provided on the rotational operation restricting head portion 33 and that of the restricting structure portion 34A provided on the deformed head portion 34A in the two-axis hinge device with rotation regulating function are determined so that the first case (where the keyboard is arranged) and the second case (where the LCD monitor is arranged) mutually perform folding operation and rotational operation in a range in which the first case and the second case do not collide against each other in a state in which the two-axis hinge device with rotation regulating function connects an external shape of the first case fastened to the stand member 16 side to that of the second case fastened to the blanket 29 side.

Namely, in the above-stated two-axis hinge device with rotation regulating function, the first case and the second case are designed so as not to collide against each other by giving a predetermined restriction to the rotational operation of the rotational axis member 20 according to an opening or closing angle of the operation regulating folding axis member 5. Particularly if the two-axis hinge device with rotation regulating function is attached to a two-folded portable telephone, the shape of the restricting structure portion 34A of the deformed head portion 34 is determined so that the first case and the second case do not relatively rotate around the rotational axis member 20 while the first case and the second case are folded into two. Thus, collision of the first case and the second case against each other can be prevented in a state where the first and second cases are folded.

In the two-axis hinge device with rotation regulating function configured as stated above, by restricting the rotational region of the rotational axis member 20 that functions as a rotational axis in accordance with each rotational (inclination) angle position of the operation regulating folding axis member 5 that functions as a folding axis, in a portable terminal device having a second case that is attached to the blanket 29 of the rotational axis member 20 and in which a liquid crystal screen as a monitor is disposed and a first case that is attached to the operation regulating folding axis member 5 and auxiliary folding axis member 17 and in which a key board is disposed, an operation for viewing the second case where the monitor is arranged at a certain optimum specific position (e.g., a position at which the monitor-side second case is opened at an angle of 90 degrees) while rotation of the second case may be performed. Furthermore, collision of the first case having the key board with the second case having the monitor can be prevented at the time when the second case is rotated with respect to the first case.

As shown in FIGS. 1 to 5, for example, in the two-axis hinge device with rotation regulating function according to the exemplary embodiment, if a surface of the rotation allowing portion 33A formed to be notched on the rotational operation range restricting head portion 33 of the operation regulating folding axis member 5 rotating integrally with the first case is located apart from the end surface of the deformed head portion 34A of the rotational axis member 20 at a position at which the second case is open at an angle of 90 degrees with respect to the first case, the deformed head portion 34 turns into a rotatable state.

Therefore, in the state shown in FIG. 1, the second case may be rotated to an optional position. Further, in the state shown in FIG. 1, a part of the restricting structure portion 34A extending from the deformed head portion 34 of the rotational axis member 20 in a radial direction is located at a position opposed to the rotation allowing portion 33A. Due to the, if the rotational operation range restricting head portion 33 is to rotate, the rotation allowing portion 33A abuts on the end surface of the restricting structure portion 34A to restrain the rotational operation.

Figure 3:
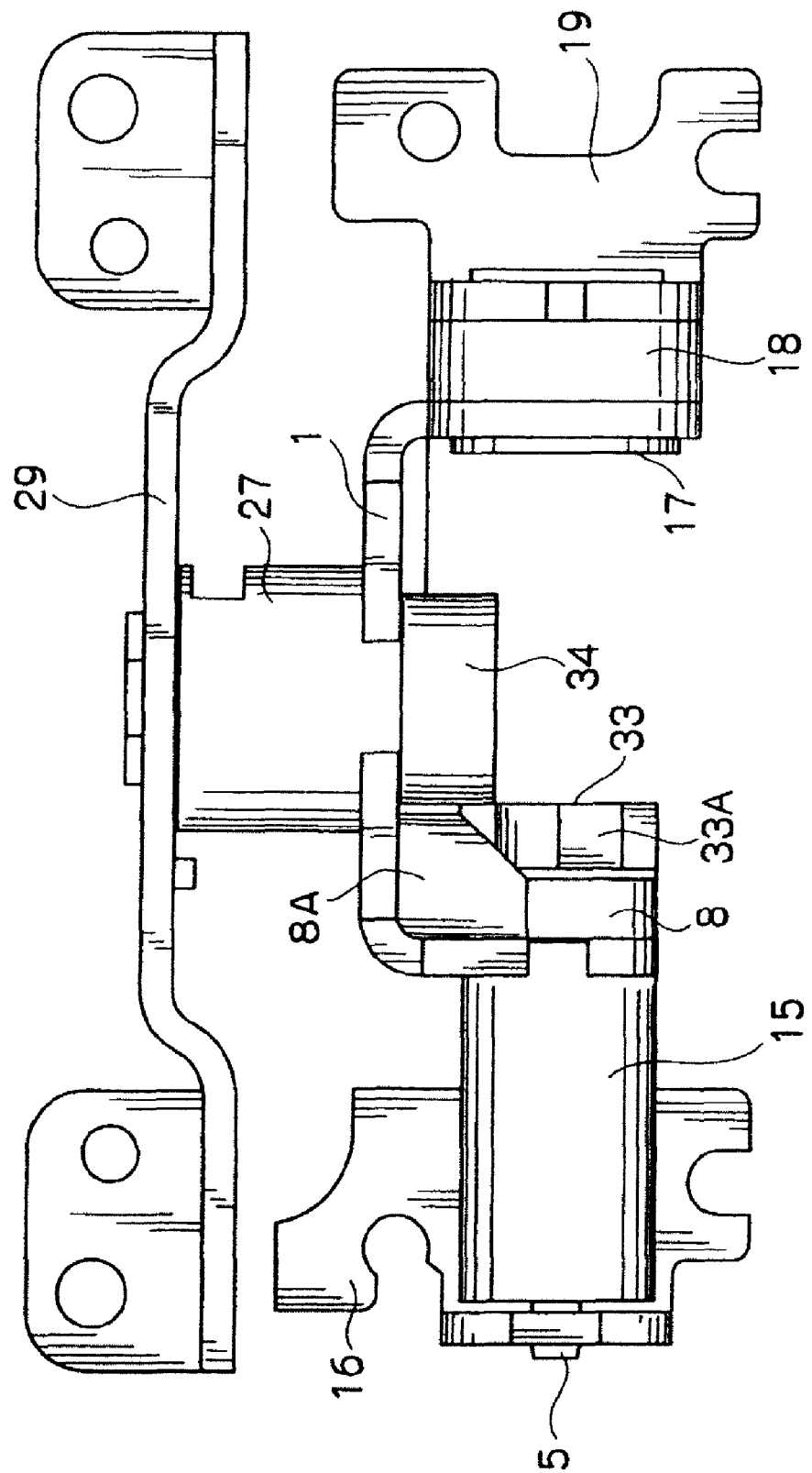
FIG. 3 is a whole plan view showing the two-axis hinge device with rotation regulating function according to the exemplary embodiment of the invention.
Figure 4:
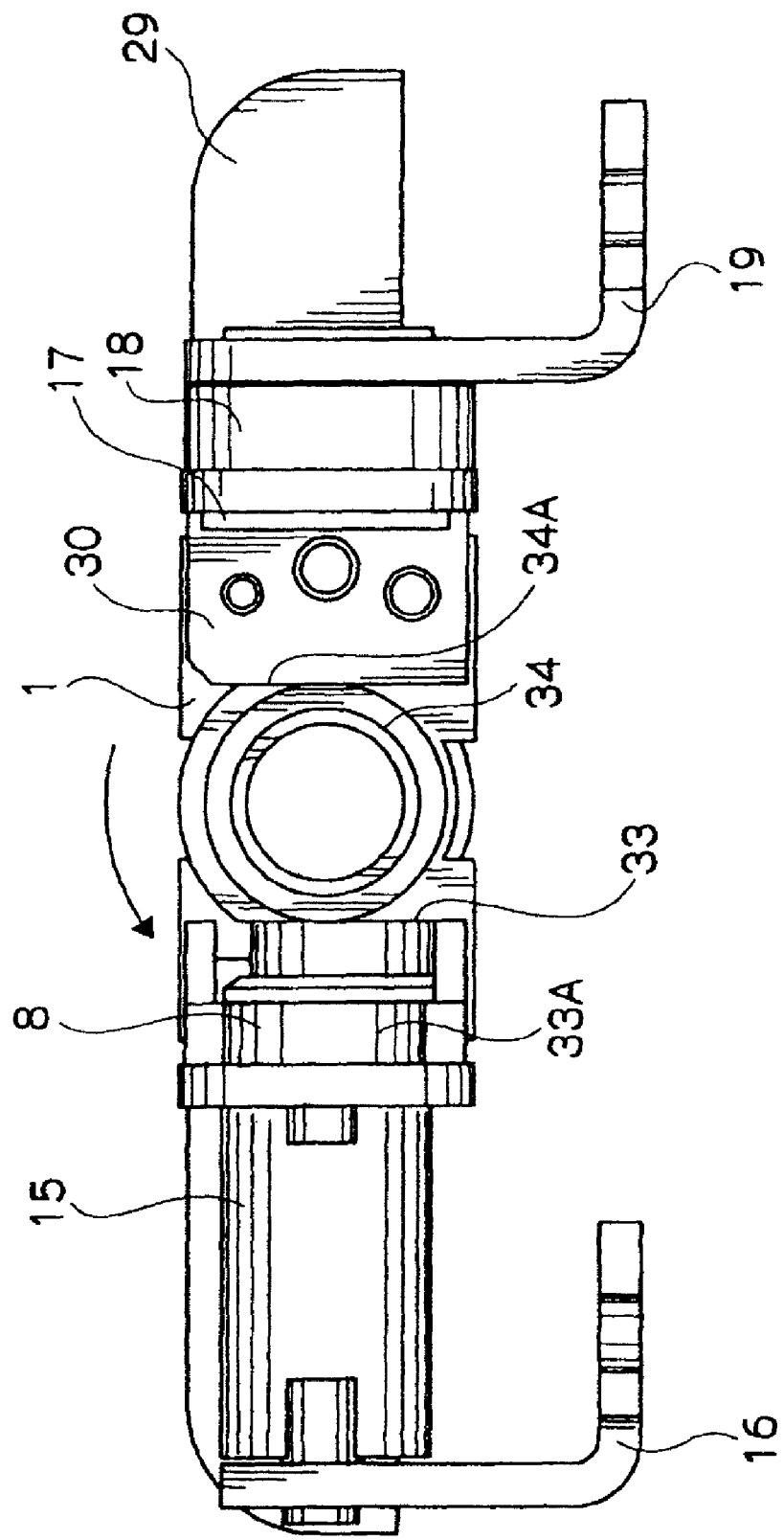
FIG. 4 is a whole front view showing the two-axis hinge device with rotation regulating function according to the exemplary embodiment of the invention.
Figure 5:
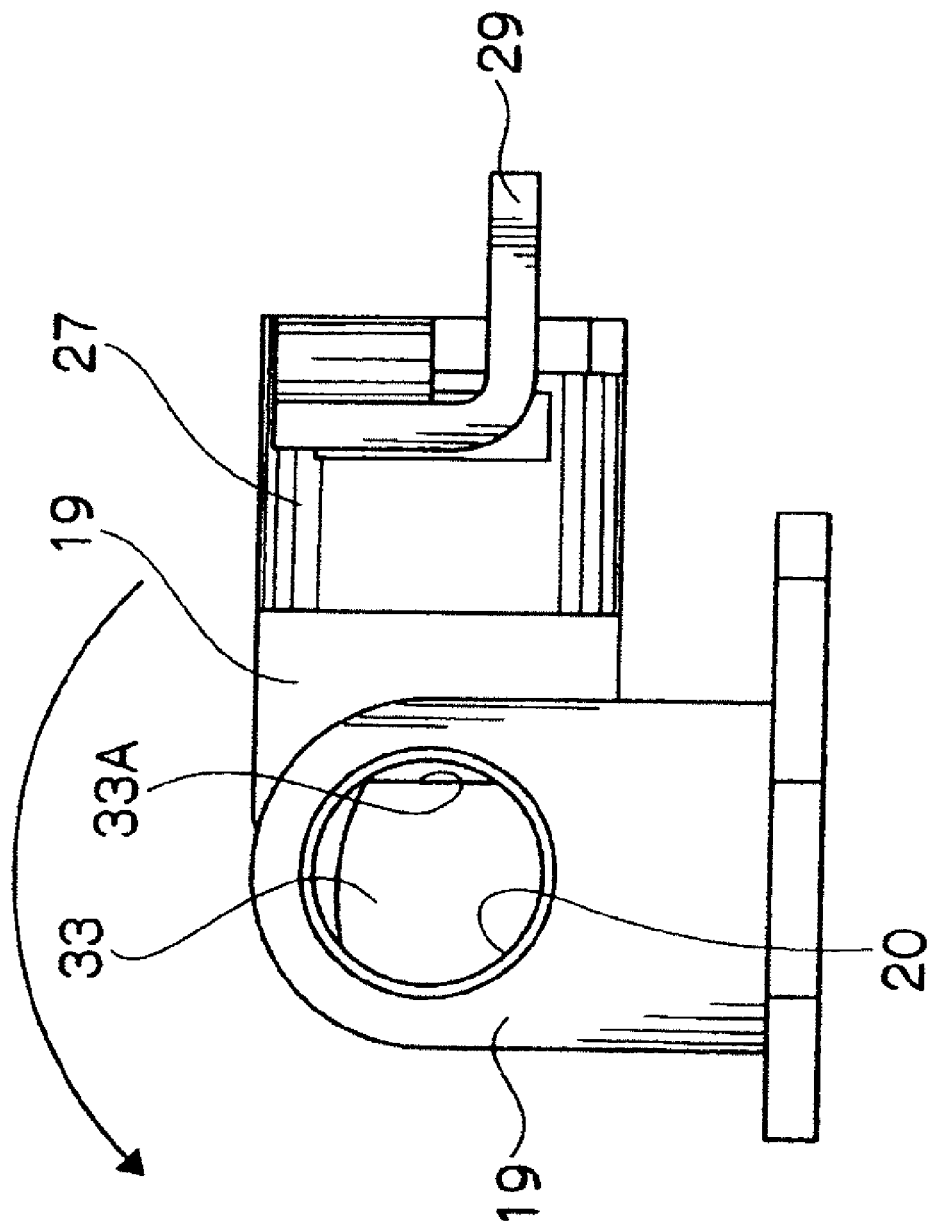
FIG. 5 is a whole side view showing the two-axis hinge device with rotation regulating function according to the exemplary embodiment of the invention.

Moreover, as shown in FIGS. 2 to 4, in the two-axis hinge device with rotation regulating function according to the exemplary embodiment, in a state wherein the side of the second case on which the monitor is disposed faces to the side of the first case on which the lye board is disposed, the rotational operation range restricting head portion 33 rotates freely in the case when the restricting structure portion 34A of the rotational axis member 20, which rotates integrally with the second case, faces the end surface of the rotational operation range restricting head portion 33 of the operation regulating folding axis member 5.

Therefore, in the state shown in FIGS. 2 to 4, the second case may be opened or closed to an optional position. Further, in the state shown in FIGS. 2 to 4, the rotation allowing portion 33A of the rotational operation range restricting head portion 33 is separate from the restricting structure portion 34A and an unnotched head end surface of the rotational operation range restricting head portion 33 is located in a range of a rotation locus of the restricting structure portion 34A. Accordingly, a part of the restricting structure portion 34A extending in the radial direction abuts on the unnotched head end surface of the rotational operation range restricting head portion 33 so as to restrain the rotation of the deformed head portion 34.

Furthermore, as shown in FIG. 2, in the state in which the second case and the first case are closed in the two-folded fashion, the rotational operation of a part of the restricting structure portion 34A is restricted on the end surface of the rotational operation range restricting head portion 33 and another part of the restricting structure portion 34A abuts on the rotation stopper 30 to restrict the rotational operation. Therefore, the second case may not be rotated around the rotational axis member 20 with respect to the first case.

Thus, in the two-axis hinge device with rotation regulating function, it cam be prevented that the second case rotates and collides with the first case while folded in two-fold.

Moreover, in the two-axis hinge device with rotation regulating function, the harness (fine electric wires) pulled out from an electronic circuit of the first case is arranged so as to be inserted into the hollow portion of the auxiliary folding axis member 17, bent in a direction forming an angle of 90 degrees, then inserted into the hollow portion of the rotational axis member 20, and then, connected to an electric circuit of the second case in a state that the rotation-regulating two-axis hinge device is disposed so that the first case having the keyboard and the second case having the LCD monitor are connected with each other.

When the harness is arranged through the inside of the two-axis hinge device with rotation regulating function, the harness is off-set toward the axis hole 3 of the base frame while being inserted into the hollow portion of the rotation axis member 20. Accordingly, the portion of the rotational operation range restricting head portion 33 on which the rotation allowing portion 33A is formed abuts a portion of the deformed head portion 34 protruding outwardly from the rotational axis 20, which is close to the circumference thereof and the restricting structure portion 34A is formed.

Namely, in the two-axis hinge device with rotation regulating function, the restricting structure portion 34A abuts on the rotation allowing portion 33A at the position at which the restricting structure portion 34A and the rotation allowing portion 33A may be located at farthest positions from the harness and which is opposite to the harness in a diameter direction while the structural restriction is imposed with respect to the position at which the harness enters the hollow portion of the rotational axis member 20 in an offset manner. It is, therefore, possible to prevent the harness from being sandwiched between the restricting structure portion 34A and the rotation allowing portion 33A and damaged or disconnected.

Needless to say, the invention is not limited to the exemplary embodiment stated above and various other configurations may be adopted in a range in which the scope of the invention is not departed.

DESCRIPTION OF REFERENCE SYMBOLS 1 base frame
2 axis hole for folding axis
3 axis hole for folding axis
4 axis hole for rotational axis
5 operation restricting folding axis member 8 folding axis holder
17 auxiliary folding axis member
18 folding axis ring
20 rotational axis member
20A spline portion
30 rotation stopper
33 rotational operation range restricting head portion
33A rotation allowing portion
34 deformed head portion
34A restricting structure portion

What is claimed is:

1. A two-axis hinge device with rotation regulating function comprising:
    a folding axis member for rotatably supporting one case;
    a rotational axis member for rotatably supporting the other case;
    a base frame setting the folding axis member and the rotational axis member to intersect each other, and rotatably supporting the folding axis member and the rotational axis member, respectively;
    a rotational operation range restricting head portion arranged on an end of the folding axis member;
    a rotation allowing portion formed by recessing an outer circumferential side surface of the rotational operation range restricting head portion into a predetermined shape;
    a rotational operation range restricting deformed head portion arranged on an end of the rotational axis member so as to face the rotational operation range restricting head portion; and
    a restricting structure portion formed at the rotational operation range restricting deformed head portion so as to restrain rotation of the folding axis member by abutting an end surface of the rotational operation range restricting deformed head portion on the rotation allowing portion formed on the outer circumferential side surface of the rotational operation range restricting head portion, and so as to restrain rotation of the rotational axis member when the outer circumferential side surface of the rotational operation range restricting head portion abuts on the end surface of the rotational operation range restricting head portion.

2. The two-axis hinge device with rotation regulating function of claim 1,
    wherein a rotation stopper is attached to the base frame so as to abut on the restricting structure portion of the rotational operation range restricting deformed head portion to restrict a rotation range of the rotational axis member.

3. The two-axis hinge device with rotation regulating function of claim 2, wherein the rotational operation range restricting head portion has a solid structure.

4. The two-axis hinge device with rotation regulating function of claim 1, wherein the rotational operation range restricting head portion has a solid structure.

5. A two-axis hinge device with rotation regulating function comprising:
    a base frame that is formed into an angular member having both ends bent in the same direction, has axis holes for a folding axis member formed at bent portions on the both ends, and has an axis hole for a rotational axis member formed at a position between the bent portions;
    the folding axis member attached to one of the axis holes for the folding axis member of the base frame so as to rotatably support one case;
    an auxiliary folding axis member having a through hole through which a harness is passed, and being attached to another one of the axis holes for the folding axis member of the base frame so as to rotatably support the one case integrally with the folding axis member;
    the rotational axis member having a through hole through which the harness is passed, and being attached to the axis hole for the rotational axis member of the base frame so as to rotatably support the other case around the rotational axis member intersecting the folding axis member;
    a rotational operation range restricting head portion arranged on an end of the folding axis member;
    a rotation allowing portion formed by recessing an outer circumferential side surface of the rotational operation range restricting head portion into a predetermined shape;
    a rotational operation range restricting deformed head portion arranged on an end of the rotational axis member to face the rotational operation range restricting head portion; and
    a restricting structure portion formed at the rotational operation range restricting deformed head portion so as to restrain rotation of the folding axis member by abutting the outer circumferential side surface of the rotation allowing portion of the rotational operation range restricting head portion on an end surface of the rotational operation range restricting deformed head portion, and so as to restrain rotation of the rotational axis member when the outer circumferential side surface of the rotational operation range restricting deformed head portion abuts on the end surface of the rotational operation restricting head portion.

6. The two-axis hinge device with rotation regulating function of claim 5, wherein a folding axis member holder having a block-shaped reinforcing structure formed integrally in the portion supporting the folding axis member is fastened to the base frame so as to be along an interior of the angular portion of the base frame in the portion in which the one axis hole for the folding axis member supporting the folding axis member is provided.

7. The two-axis hinge device with rotation regulating function of claim 5, wherein a rotation stopper is attached to the base frame so as to abut on the restricting structure portion of the rotational operation range restricting deformed head portion to restrict a rotation range of the rotational axis member.

8. The two-axis hinge device with rotation regulating function of any one of claim 7, wherein the rotational operation range restricting head portion has a solid structure.

9. The two-axis hinge device with rotation regulating function of claim 5, wherein the rotational operation range restricting head portion has a solid structure.

* * * * *